United States Patent
Esche et al.

(10) Patent No.: US 10,087,390 B2
(45) Date of Patent: Oct. 2, 2018

(54) LUBRICANT ADDITIVE FOR REDUCING TIMING CHAIN WEAR

(71) Applicant: VANDERBILT CHEMICALS, LLC, Norwalk, CT (US)

(72) Inventors: Carl K. Esche, Richmond, VA (US); Glenn A. Mazzamaro, Middlebury, CT (US)

(73) Assignee: VANDERBILT CHEMICALS, LLC, Norwalk, CT (US)

( * ) Notice: Subject to any disclaimer, the term of this patent is extended or adjusted under 35 U.S.C. 154(b) by 0 days.

(21) Appl. No.: 15/145,368

(22) Filed: May 3, 2016

(65) Prior Publication Data

US 2016/0326451 A1    Nov. 10, 2016

Related U.S. Application Data

(60) Provisional application No. 62/156,615, filed on May 4, 2015.

(51) Int. Cl.
    *C10M 163/00* (2006.01)
    *C10M 137/10* (2006.01)
    (Continued)

(52) U.S. Cl.
    CPC ........ *C10M 141/10* (2013.01); *C10M 141/12* (2013.01); *F16H 57/05* (2013.01);
    (Continued)

(58) Field of Classification Search
    CPC .............. C10M 137/06; C10M 133/16; C10M 2223/042
    (Continued)

(56) References Cited

U.S. PATENT DOCUMENTS 5,925,600 A     7/1999  Atherton
7,897,552 B2 *  3/2011  Ellington ............. C10M 141/12
                                              508/362

(Continued)

FOREIGN PATENT DOCUMENTS

WO    2005/035700 A1    4/2005

OTHER PUBLICATIONS

International Search Report dated Aug. 5, 2016.

*Primary Examiner* — Prem C Singh
*Assistant Examiner* — Francis C Campanell
(74) *Attorney, Agent, or Firm* — Norris McLaughlin & Marcus P.A.

(57) ABSTRACT

A lubricant composition is provided which mitigates the negative effect of zinc in ZDDP with respect to wear on timing chains by using in contact with the timing chain a lubricant composition comprising an ashless zinc-free organophosphorus compound and optionally zinc dialkyldithiophosphate, together providing about 50 to about 1000 ppm phosphorus, preferably about 300-800 ppm phosphorus, and more preferably about 500-750 ppm phosphorus; less than about 350 ppm to lower than <1 ppm zinc from ZDDP; and at least about 100 ppm molybdenum from an organomolybdenum compound (preferably molybdate ester); wherein the Mo:Zn ratio is at least about 0.2:1 and the Zn:P ratio is lower than or equal to about 1.1:1; or in the alternative an organomolybdenum compound providing between about 300-700 ppm molybdenum, in combination with ZDDP providing zinc between about 200-800 ppm zinc, wherein the ratio of Mo:Zn ratio is at least about 0.4:1 to about 3:1.

6 Claims, 5 Drawing Sheets

Timing Chain Wear Bench Test Results for Non-Zinc Containing Antiwear Additives

(51) Int. Cl.
*C10M 141/10* (2006.01)
*F16H 57/05* (2006.01)
*C10M 141/12* (2006.01)

(52) U.S. Cl.
CPC . *C10M 2207/289* (2013.01); *C10M 2215/082* (2013.01); *C10M 2219/068* (2013.01); *C10M 2223/045* (2013.01); *C10M 2223/047* (2013.01); *C10M 2227/066* (2013.01); *C10N 2210/02* (2013.01); *C10N 2210/06* (2013.01); *C10N 2230/06* (2013.01); *C10N 2230/42* (2013.01); *C10N 2240/10* (2013.01); *C10N 2240/52* (2013.01)

(58) Field of Classification Search
USPC .................................................. 508/364, 369
See application file for complete search history.

(56) References Cited

U.S. PATENT DOCUMENTS

| | | |
|---|---|---|
| 2003/0224950 A1 | 12/2003 | Esche et al. |
| 2011/0237474 A1* | 9/2011 | Mazzamaro ......... C10M 141/08 508/364 |
| 2013/0251956 A1* | 9/2013 | Sugimoto ............. C23C 14/027 428/174 |
| 2014/0228264 A1 | 8/2014 | Mazzamaro et al. |

\* cited by examiner

Timing Chain Wear Bench Test Results for Non-Zinc Containing Antiwear Additives

Timing Chain Wear Bench Test Results for Test Oils with Reduced Level of Zinc

Timing Chain Wear Bench Test Results for Test Oils with Various Levels of Molybdenum Timing Chain Wear Bench Test Results for Test Oils Formulated With Different Molybdenum Additives Timing Chain Wear Bench Test Results for the Four DOE Oils

LUBRICANT ADDITIVE FOR REDUCING TIMING CHAIN WEAR

BACKGROUND OF THE INVENTION

This invention teaches a particular set of additives that when added to fully formulated engine oil, as used in internal combustion engines, which additives reduce timing chain wear. In particular, this invention teaches the use of zinc dialkyldithiophosphates (ZDDP) used in combination with A) ashless alkyl dithiophosphate ester, B) an alkylphosphate alkylammonium salt, C) a molybdenum-containing friction modifier or D) any combination of A, B and C, in a fully formulated engine oil. The invention also contemplates a lubricant, which is substantially free (i.e. <1 ppm zinc) of ZDDP, and containing an additive selected from one or more of A-D above. In addition, the invention teaches methods for reducing timing chain wear by using lubricating composition formulated as above, as well as a system including an engine having such a lubricating composition in contact with the timing chain present within the engine (e.g. internal combustion engine).

Governments around the world have passed legislation requiring automobile manufacturers to improve vehicle performance with respect to reducing greenhouse emissions and improving fuel efficiency. To meet these tough targets, automobile manufacturers have introduced new engine technology. One new engine technology recently introduced is the turbocharged direct injection engine ("T-GDI"). Unfortunately the T-GDI engine is experiencing higher than normal timing chain wear. The automobile manufacturers judge the timing chain wear problem to be such a significant concern that the next generation passenger car motor oil specification is expected to have a timing chain wear engine test as part of the specification.

A timing chain is composed of links and pins. The pin is used to hold two chain links together and the chain links are the building blocks of the timing chain. When the automobile's engine is running, the timing chain link pivots around the pin as the chain is pulled by the gear teeth. Wear occurs on the inside of the link aperture by the action of the pin articulating against the link aperture. This wear action causes the link aperture to enlarge over time and the pin to reduce in diameter. Chains become elongated as the numerous joints of the chain wear. The timing chain coordinates the opening and closing of the intake and exhaust valves with respect to piston position. The intake valves allow fuel into the combustion chamber and the exhaust valves allow for the discharge of the spent combustion gases. If the timing chain becomes sufficiently elongated such that it no longer stays in place and consequently jumps a sprocket tooth the timing for the opening and closing of the intake and exhaust valves with respect to the piston moving up and down in the cylinder is disrupted to the point of improper engine combustion.

Timing chains operate in a severe environment inside an engine. Because of this, it is a common practice in the industry to coat the timing chain to protect it. Non-limiting, examples of coatings include: nitride coatings such as carbonitride, titanium nitride and chromized coatings, and carbide coatings such as vanadium carbide.

SUMMARY OF THE INVENTION

Zinc dialkydithiophosphates (ZDDP) have been the mainstay antiwear for engine oils for over fifty years. They also impart antioxidant properties to an engine oil. Passenger car specifications have mandated a minimum phosphorus level in the engine oil specifications to ensure the engine oil impart sufficient anti-wear protection to an engine. We have recently discovered that ZDDP, and particularly the zinc component, may promote timing chain wear and that certain ashless organophosphorus compounds used in place of some or all of the ZDDP to replace the phosphorus component, will help reduce timing chain wear in today's modern engines. In particular, it is believed that zinc has an adverse effect on the timing chain coating. Ashless phosphorus compounds suitable for reducing wear can be either ashless sulfur containing organophosphorus esters or ashless sulfur free organophosphorus ammonium salt compounds alone, in combination with each other or with ZDDP. It has also been discovered the molybdenum-containing compounds, used alone or combination with the referenced ashless phosphorus compounds, may be used in place of some or all of the ZDDP in order to retain the antiwear and antioxidant capabilities of the ZDDP. Non-limiting examples of the antiwear additives mentioned above are given below.

In summary, it has been discovered that the negative effect of zinc in ZDDP with respect to wear on engine timing chains, can be surprisingly addressed by using in contact with the timing chain a lubricant composition comprising one or more of the following:

1. An ashless zinc-free organophosphorus compound and optionally zinc dialkyldithiophosphate, together providing about 50 to about 1000 ppm phosphorus, preferably about 300-800 ppm phosphorus, and more preferably about 500-750 ppm phosphorus; less than about 350 ppm to lower than <1 ppm zinc from ZDDP; and at least about 100 ppm molybdenum from an organomolybdenum compound (preferably molybdenum ester amide); wherein the Mo:Zn ratio is at least about 0.2:1, preferably about 0.3:1, and the Zn:P ratio is lower than or equal to about 1.1:1.

2. An organomolybdenum compound providing between about 100-1000 ppm, preferably 300-700 ppm molybdenum, in combination with ZDDP providing zinc between about 200-800 ppm zinc, wherein the ratio of Mo:Zn is at least about 0.4:1 to about 3:1

3. Molybdenum dialkyldithiophosphate providing at least about 90 ppm molybdenum and at least about 50 ppm phosphorus, wherein the zinc level from ZDDP is less <1 ppm zinc.

Figure 1:
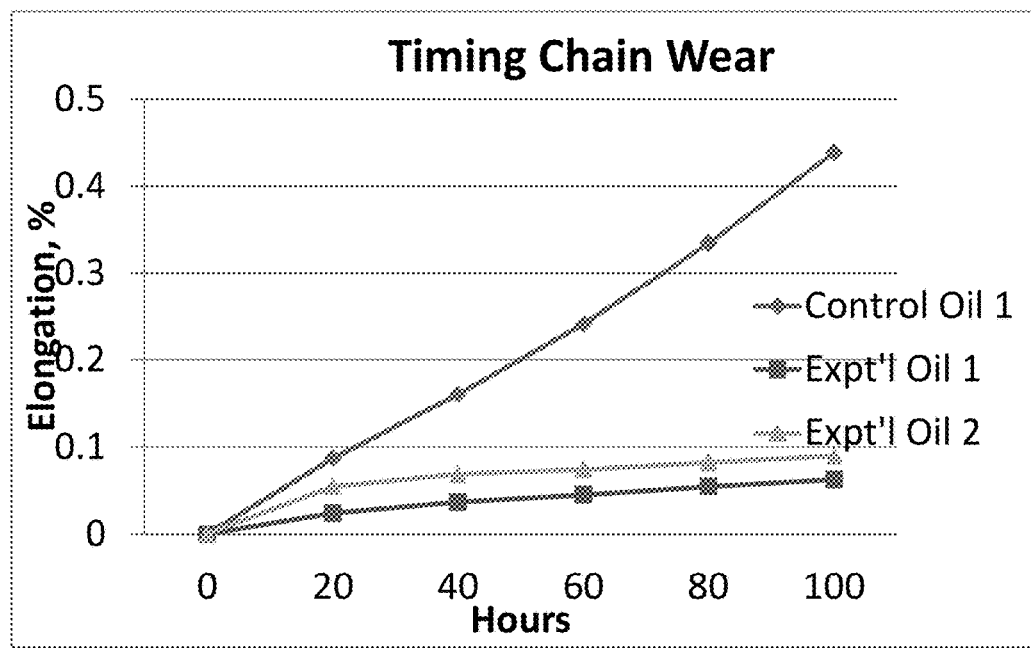
FIG. 1 is a graph showing Timing Chain Wear Bench Test Results for Non-Zinc Containing Antiwear Additives.

DETAILED DESCRIPTION OF THE INVENTION (A) Zinc Dialkyldithiophosphates

ZDDPs are well known for their excellent antiwear and antioxidant properties. There are many published patents that teach their manufacture including U.S. Pat. Nos. 4,904,401; 4,957,649; and 6,114,288. Non-limiting examples of ZDDPs used in passenger car engine oils are primary, secondary and mixed ZDDPs. The term primary and secondary refer to those ZDDPs prepared from primary, secondary or mixtures or primary and secondary alcohols. A low volatility ZDDP is also suitable for this invention. The term low volatility is defined by the GF-5 specification which is the current specification for gasoline powered automobiles. Some ZDDPs are known to be basic because of the additional base used during their manufacture. A non-limiting example of a ZDDP used in engine oils is zinc O-isopropyl, O-2-ethyl-hexyl dithiophosphate.

(B) Ashless Sulfur-Containing Organophosphorus Compounds

In general, any oil soluble, ashless, zinc-free, sulfur-containing phosphorus antiwear compound is suitable for this invention. A non-limiting general structure of the compound is shown below, Formula I. The "R" groups can be the same or different and can be any alkyl, aryl, arylalkyl or substituted alkyl group that renders the additive oil soluble. Generally speaking, the "R" group should contain at least three carbon atoms to render the molecule oil soluble.

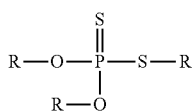

Formula I

An example of a commercial additive used in the invention that reduced timing chain wear is VANLUBE® 727 available from Vanderbilt Chemicals, LLC of Norwalk, Conn., USA.

(C) Ashless and Sulfur-Free Organophosphorus Compounds

Any oil soluble ashless, zinc-free, sulfur-free organophosphorus ammonium salt antiwear compound is suitable for this invention. A non-limiting general structure of the compound is shown below, Formula II. The "R" groups can be the same or different and can be any alkyl, aryl, arylalkyl or substituted alkyl group that renders the additive oil soluble. Generally speaking, the "R" group should contain at least three carbon atoms to render the molecule oil soluble. The preferred number of carbons for the $R_1$ group is three to fifteen carbon atoms. The preferred carbon length for the $R_2$ group is eight to twenty four carbon atoms.

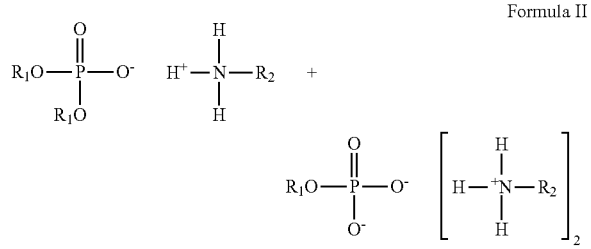

Formula II

An example of a commercial additive used in the invention that reduced timing chain wear is VANLUBE® 9123 from Vanderbilt Chemicals, LLC.

(D) Organomolybdenum Compounds

A preferred organomolybdenum compound is molybdenum ester amide prepared by reacting about 1 mole of fatty oil, about 1.0 to 2.5 moles of diethanolamine and a molybdenum source sufficient to yield about 0.1 to 12.0 percent of molybdenum based on the weight of the complex at elevated temperatures (i.e. greater than room temperature). A temperature range of about 70° to 160° C. is considered to be an example of an embodiment of the invention. The organomolybdenum component of the invention is prepared by sequentially reacting fatty oil, diethanolamine and a molybdenum source by the condensation method described in U.S. Pat. No. 4,889,647, incorporated herein by reference, and is commercially available from Vanderbilt Chemicals, LLC as MOLYVAN® 855. The reaction yields a reaction product mixture. The major components are believed to have the structural formulae, Formula III:

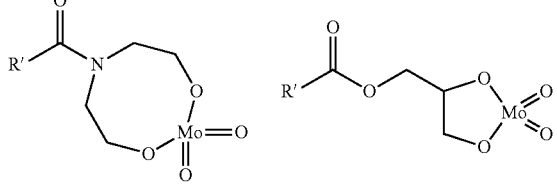

Formula III wherein R' represents a fatty oil residue. An embodiment for the present invention are fatty oils which are glyceryl esters of higher fatty acids containing at least 12 carbon atoms and may contain 22 carbon atoms and higher. Such esters are commonly known as vegetable and animal oils. Examples of useful vegetable oils are oils derived from coconut, corn, cottonseed, linseed, peanut, soybean and sunflower seed. Similarly, animal fatty oils such as tallow may be used. The source of molybdenum may be an oxygen-containing molybdenum compound capable of reacting with the intermediate reaction product of fatty oil and diethanolamine to form an ester-type molybdenum complex. The source of molybdenum includes, among others, ammonium molybdates, molybdenum oxides and mixtures thereof.

A sulfur- and phosphorus-free organomolybdenum compound that may be used can be prepared by reacting a sulfur- and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds include the following:

1. Compounds prepared by reacting certain basic nitrogen compounds with a molybdenum source as described in U.S. Pat. Nos. 4,259,195 and 4,261,843.

2. Compounds prepared by reacting a hydrocarbyl substituted hydroxy alkylated amine with a molybdenum source as described in U.S. Pat. No. 4,164,473.

3. Compounds prepared by reacting a phenol aldehyde condensation product, a mono-alkylated alkylene diamine, and a molybdenum source as described in U.S. Pat. No. 4,266,945.

4. Compounds prepared by reacting a fatty oil, diethanolamine, and a molybdenum source as described in U.S. Pat. No. 4,889,647.

5. Compounds prepared by reacting a fatty oil or acid with 2-(2-aminoethyl)aminoethanol, and a molybdenum source as described in U.S. Pat. No. 5,137,647.

6. Compounds prepared by reacting a secondary amine with a molybdenum source as described in U.S. Pat. No. 4,692,256.

7. Compounds prepared by reacting a diol, diamino, or amino-alcohol compound with a molybdenum source as described in U.S. Pat. No. 5,412,130.

8. Compounds prepared by reacting a fatty oil, monoalkylated alkylene diamine, and a molybdenum source as described in U.S. Pat. No. 6,509,303.

9. Compounds prepared by reacting a fatty acid, monoalkylated alkylene diamine, glycerides, and a molybdenum source as described in U.S. Pat. No. 6,528,463.

Examples of commercially available sulfur- and phosphorus-free oil soluble molybdenum compounds are available under the trade name SAKURA-LUBE from Adeka Corporation, and MOLYVAN®. from Vanderbilt Chemicals, LLC. One example of a sulfur and phosphorus free oil soluble molybdenum compound is MOLYVAN® 855 from Vanderbilt Chemicals, LLC.

Sulfur-containing organomolybdenum compounds may be used and may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3S_{13}*nH_2O$ where n varies between 0 and 2, with a tetralkylthiuram disulfide, produces a trinuclear sulfur-containing molybdenum dithiocarbamate.

Examples of sulfur-containing organomolybdenum compounds appearing in patents and patent applications include the following:

1. Compounds prepared by reacting molybdenum trioxide with a secondary amine and carbon disulfide as described in U.S. Pat. Nos. 3,509,051 and 3,356,702.

2. Compounds prepared by reacting a sulfur-free molybdenum source with a secondary amine, carbon disulfide, and an additional sulfur source as described in U.S. Pat. No. 4,098,705.

3. Compounds prepared by reacting a molybdenum halide with a secondary amine and carbon disulfide as described in U.S. Pat. No. 4,178,258.

4. Compounds prepared by reacting a molybdenum source with a basic nitrogen compound and a sulfur source as described in U.S. Pat. Nos. 4,263,152, 4,265,773, 4,272,387, 4,285,822, 4,369,119, and 4,395,343.

5. Compounds prepared by reacting ammonium tetrathiomolybdate with a basic nitrogen compound as described in U.S. Pat. No. 4,283,295.

6. Compounds prepared by reacting an olefin, sulfur, an amine and a molybdenum source as described in U.S. Pat. No. 4,362,633.

7. Compounds prepared by reacting ammonium tetrathiomolybdate with a basic nitrogen compound and an organic sulfur source as described in U.S. Pat. No. 4,402,840.

8. Compounds prepared by reacting a phenolic compound, an amine and a molybdenum source with a sulfur source as described in U.S. Pat. No. 4,466,901.

9. Compounds prepared by reacting a triglyceride, a basic nitrogen compound, a molybdenum source, and a sulfur source as described in U.S. Pat. No. 4,765,918.

10. Compounds prepared by reacting alkali metal alkylthioxanthate salts with molybdenum halides as described in U.S. Pat. No. 4,966,719.

11. Compounds prepared by reacting a tetralkylthiuram disulfide with molybdenum hexacarbonyl as described in U.S. Pat. No. 4,978,464.

12. Compounds prepared by reacting an alkyl dixanthogen with molybdenum hexacarbonyl as described in U.S. Pat. No. 4,990,271.

13. Compounds prepared by reacting alkali metal alkylxanthate salts with dimolybdenum tetra-acetate as described in U.S. Pat. No. 4,995,996.

14. Compounds prepared by reacting $(NH_4)_2MO_3S_{13}*2H_2O$ with an alkali metal dialkyldithiocarbamate or tetralkyl thiuram disulfide as described in U.S. Pat. No. 6,232,276.

15. Compounds prepared by reacting an ester or acid with a diamine, a molybdenum source and carbon disulfide as described in U.S. Pat. No. 6,103,674.

16. Compounds prepared by reacting an alkali metal dialkyldithiocarbamate with 3-chloropropionic acid, followed by molybdenum trioxide, as described in U.S. Pat. No. 6,117,826.

17. Trinuclear moly compounds prepared by reacting a moly source with a ligand sufficient to render the moly additive oil soluble and a sulfur source as described in U.S. Pat. Nos. 6,232,276; 7,309,680 and WO99/31113.

Examples of commercially available sulfur-containing oil soluble molybdenum compounds are available under the trade name SAKURA-LUBE®, from Adeka Corporation, and MOLYVAN® 822 from Vanderbilt Chemicals.

Molybdenum dithiocarbamates may be present as either the organomolybdenum compound and/or as the dithiocarbamate, and may be illustrated by the following structure,

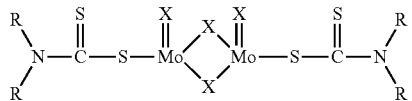

where R is an alkyl group containing 4 to 18 carbons or H, and X is O or S.

Another sulfur containing molybdenum compound suitable for this invention is a molybdenum dialkyldithiophosphate (MoDDP). These are prepared in a manner similar to ZDDP but with molybdenum. Methods of prepared moDDPs are reported in U.S. Pat. No. 3,446,735.

Examples of commercially available sulfur and phosphorus containing oil soluble molybdenum compounds are available under the trade name SAKURA-LUBE®, from Adeka Corporation and MOLYVAN® L from Vanderbilt Chemicals, LLC.

The additives of the above invention would be formulated into a lubricant composition suitable for spark ignition (gasoline) engines. For spark ignition engines the lubricant composition would meet or exceed the current engine standard GF-5 as defined by API. The finished oil may contain the following ingredients.

(1) Oxidation Inhibitors (A) Alkylated Diphenyl Amines (ADPA)

Alkylated diphenylamines, also known as diarylamine antioxidants, include, but are not limited to diarylamines having the formula:

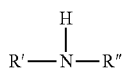

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenylamine; dibutyldiphenylamine; monooctyldiphenylamine; dioctyldiphenylamine; monononyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyldiphenylamine; p-oriented styrenated diphenylamine; mixed butyloctyldiphenylamine; and mixed octylstyryldiphenylamine.

Examples of commercially available diarylamines include, for example, diarylamines available under the trade name IRGANOX® from Ciba Specialty Chemicals; NAUGALUBE® from Chemtura Corporation; GOODRITE® from Emerald Polymer Additives, LLC; and VANLUBE® from Vanderbilt Chemicals, LLC.

Examples of ADPAs from these companies are VANLUBE® SL (mixed alklyated diphenylamines), VANLUBE® NA (mixed alklyated diphenylamines), VANLUBE® 81 (p,p'-dioctyldiphenylamine) and VANLUBE® 961 (mixed octylated and butylated diphenylamines) manufactured by Vanderbilt Chemicals, LLC, Naugalube® 640, 680 and 438L manufactured by Chemtura Corporation and Irganox® L-57 and L-67 manufactured by BASF Corporation and Lubrizol 5150A & C manufactured by Lubrizol. Another class of aminic antioxidants includes phenothiazine or alkylated phenothiazine having the chemical formula:

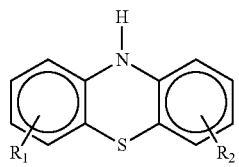

wherein $R_1$ is a linear or branched $C_1$ to $C_{24}$ alkyl, aryl, heteroalkyl or alkylaryl group and $R_2$ is hydrogen or a linear or branched $C_1$ to $C_{24}$ alkyl, heteroalkyl, or alkylaryl group. Alkylated phenothiazine may be selected from the group consisting of monotetradecylphenothiazine, ditetradecylphenothiazine, monodecylphenothiazine, didecylphenothiazine, monononylphenothiazine, dinonylphenothiazine, monooctylphenothiazine, dioctylphenothiazine, monobutylphenothiazine, dibutylphenothiazine, monostyrylphenothiazine, distyrylphenothiazine, butyloctylphenothiazine, and styryloctylphenothiazine.

(B) Hindered Phenol

A preferred hindered phenol is available from Vanderbilt Chemicals LLC as Vanlube® BHC (Iso-octyl-3-(3,5-di-tert-butyl-4-hydroxyphenyl) propionate). Other hindered phenols may include oil-soluble non-sulfur phenolics, including but not limited to those described in U.S. Pat. No. 5,772,921, incorporated herein by reference. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylene-bis(2,6-di-tert-butylphenol) and mixtures thereof as described in U.S Publication No. 2004/0266630.

(C) Dithiocarbamate (i) Ashless Bisdithiocarbamate

The bisdithiocarbamates of formula II are known compounds described in U.S. Pat. No. 4,648,985, incorporated herein by reference:

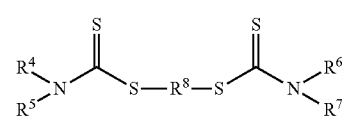

The compounds are characterized by $R^4$, $R^5$, $R^6$ and $R^7$ which are the same or different and are hydrocarbyl groups having 1 to 13 carbon atoms. Embodiments for the present invention include bisdithiocarbamates wherein $R^4$, $R^5$, $R^6$ and $R^7$ are the same or different and are branched or straight chain alkyl groups having 1 to 8 carbon atoms. $R^8$ is an aliphatic group such as straight and branched alkylene groups containing 1 to 8 carbons.

A preferred ashless dithiocarbamate is methylene-bis-dialkyldithiocarbamate, where alkyl groups contain 3-16 carbon atoms, and is available commercially under the tradename VANLUBE® 7723 from Vanderbilt Chemicals, LLC.

The ashless dialkyldithiocarbamates include compounds that are soluble or dispersable in the additive package. It is also preferred that the ashless dialkyldithiocarbamate be of low volatility, preferably having a molecular weight greater than 250 daltons, most preferably having a molecular weight greater than 400 daltons. Examples of ashless dithiocarbamates that may be used include, but are not limited to, methylenebis(dialkyldithiocarbamate), ethylenebis(dialkyldithiocarbamate), isobutyl disulfide-2,2'-bis(dialkyldithiocarbamate), hydroxyalkyl substituted dialkyldithiocarbamates, dithiocarbamates prepared from unsaturated compounds, dithiocarbamates prepared from norbornylene, and dithiocarbamates prepared from epoxides, where the alkyl groups of the dialkyldithiocarbamate can preferably have from 1 to 16 carbons. Examples of dialkyldithiocarbamates that may be used are disclosed in the following patents: U.S. Pat. Nos. 5,693,598; 4,876,375; 4,927,552; 4,957,643; 4,885,365; 5,789,357; 5,686,397; 5,902,776; 2,786,866; 2,710,872; 2,384,577; 2,897,152; 3,407,222; 3,867,359; and 4,758,362.

Examples of preferred ashless dithiocarbamates are: methylenebis(dibutyldithiocarbamate), ethylenebis(dibutyldithiocarbamate), isobutyl disulfide-2,2'-bis(dibutyldithiocarbamate), dibutyl-N,N-dibutyl-(dithiocarbamyl)succinate, 2-hydroxypropyl dibutyldithiocarbamate, butyl(dibutyldithiocarbamyl)acetate, and S-carbomethoxy-ethyl-N,N-dibutyl dithiocarbamate. The most preferred ashless dithiocarbamate is methylenebis(dibutyldithiocarbamate).

(ii) Ashless Dithiocarbamate Ester.

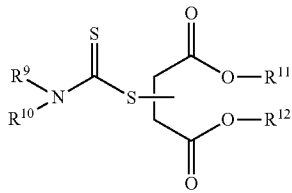

(III)

The compounds of formula III are characterized by groups $R^9$, $R^{10}$, $R^{11}$ and $R^{12}$ which are the same or different and are hydrocarbyl groups having 1 to 13 carbon atoms. VANLUBE® 732 (dithiocarbamate derivative) and VANLUBE® 981 (dithiocarbamate derivative) are commercially available from Vanderbilt Chemicals, LLC.

(iii) Metal Dithiocarbamates.

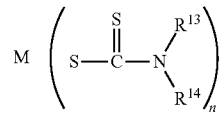

(IV)

The dithiocarbamates of the formula IV are known compounds. One of the processes of preparation is disclosed in U.S. Pat. No. 2,492,314, which is hereby incorporated by reference. $R^{13}$ and $R^{14}$ in the formula IV represent branched and straight chain alkyl groups having 1 to 8 carbon atoms, M is a metal cation and n is an integer based upon the valency of the metal cation (e.g. n=1 for sodium (Na$^+$); n=2 for zinc (Zn$^{2+}$); etc.). Molybdenum dithiocarbamate processes are described in U.S. Pat. Nos. 3,356,702; 4,098,705; and 5,627,146, each of which is hereby incorporated by reference. Substitution is described as branched or straight chain ranging from 8 to 13 carbon atoms in each alkyl group.

Embodiments for the present invention include metal dithiocarbamates such as antimony, zinc, tungsten and molybdenum dithiocarbamates. A preferred metal dithiocarbamate is zinc diamyldithiocarbamate, available as Vanlube® AZ, but may also be zinc dibutyldithiocarbamate or piperidinium pentamethylene dithiocarbamate (2) Dispersant Additives Dispersants additives useful in the invention are formed from an oil soluble polymeric hydrocarbon backbone with suitable functionality to react with a polar molecule, for example a polyamine, to allow the molecule to associate with the particle to be dispersed. Dispersants are typically capped with boric acid, other dispersants, maleic anhydride, glycolic acid or other molecules to minimize seal incompatibility and corrosion. Dispersants maybe selected from Mannich dispersants as described in U.S. Pat. Nos. 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804 and 5,633,326; Koch dispersants as described in U.S. Pat. Nos. 5,936,041, 5,643,859 and 5,627,257 and polyalkylene succinimide dispersants as described in U.S. Pat. Nos. 5,851,965, 5,853,434 and 5,792,729.

(3) Detergent Additives

Metal containing or ashless detergents function both as detergents to remove or reduce deposits and as acid neutralizers or rust inhibitors to scavenge acids thereby reducing wear and helping keep the engine clean. Known detergent additives include oil soluble neutral or overbased sulfonates, phenates, sulfurized phenates, thiophosphonates, salicylates and naphthenates and other oil soluble carboxylates or a metal, particularly the alkali or alkaline earth metals. Examples of these metals are sodium, potassium, lithium, calcium and magnesium with the most common being calcium. The total base number (TBN) of the additive can range from 20 to 450. The most commonly used detergent additive is the nominal 300 TBN overbased calcium sulfonate. Overbased magnesium sulfonates are also suitable for use with this invention.

(4) VI Improvers

Viscosity modifiers are added to formulation to increase the viscosity of lubricating oil. Viscosity modifiers may also impart additional properties to lubricating oil and these are called multifunction viscosity modifiers. Non-limiting examples of suitable viscosity modifiers are polyisobutylene, copolymers of ethylene and propylene or higher alpha-olefin, polymethacrylates, polyalkylmethacrylates, polymethacrylate co-polymers, copolymers of an unsaturated dicarboxylic acid and vinyl compound, inter polymers of styrene and acrylic esters and partially hydrogenated copolymers of styrene/isoprene, styrene/butadiene, and isoprene/butadiene as well as partially hydrogenated homopolymers of butadiene and isoprene and isoprene/divinylbenzene.

Functionalized olefin copolymers that may also be used include interpolymers of ethylene and propylene that have been grafted with an active monomer such as maleic anhydride and then derivatized with an aminic or alcohol containing compound.

(5) Base Oils

The inventive composition preferably comprises at least one lubricating oil or base oil, preferably comprising at least 90% weight of the overall lubricating composition. Suitable lubricating or base oil include mineral oils, synthetic oils and natural oils.

Mineral oils are known per se and are commercially available. They are generally obtained from mineral oil or crude oil by distillation and/or refining and optionally further purification and finishing processes, the term "mineral oil" including in particular the higher-boiling fractions of crude or mineral oil. In general, the boiling point of mineral oil is higher than 200° C., preferably higher than 300° C., at 5000 Pa. Mineral oils have, depending on their origin, different proportions of aromatic, cyclic, branched and linear hydrocarbons.

An improved class of mineral oils (reduced sulfur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

GTL oils may be oils from Fischer-Tropsch-synthesised hydrocarbons made from synthesis gas containing hydrogen and carbon monoxide using a Fischer-Tropsch catalyst. These hydrocarbons typically require further processing in order to be useful as base oil. For example, they may, by methods known in the art be hydroisomerized, dewaxed, or hydroisomerized and dewaxed.

Natural oils are animal or vegetable oils, for example jojoba oils.

Base oils for lubricant oil formulations are divided into groups according to API (American Petroleum Institute), see Table A below.

TABLE A

Group I-V Base Oils Description

| Base Oil | Sulfur, % | | Saturates, % | Viscosity Index |
|---|---|---|---|---|
| Group I | >0.03 | and/or | <90 | 80-120 |
| Group II | ≤0.03 | " | ≥90 | 80-120 |
| Group III | ≤0.03 | " | ≥90 | ≥120 |
| Group IV | * | " | | |
| Group V | ** | " | | |

* Group IV base oils are defined as all polyalphaolefins
** Group V base oils are defined as all other base oils not included in Groups I, II, III and IV.

These lubricant oils may also be used as mixtures and are commercially available.

Timing Chain Wear Bench Test Procedure

A chain wear test stand running in a configuration typically referred to as a 4 square setup was used to perform the wear test of the timing chain. This chain wear test stand consisted of a motor to rotate the chains, a hydraulic cylinder to apply tensile load to the chain. As the test progresses the chain is removed at specified interval and measured for center distance elongation compared to the initial new chain condition which gives an overall measurement of the wear of the elements in the chain joint. The Center Distance is the distance between the shaft centers of a chain and the two sprocket system. The following test parameters were used during the test: 200° F. oil temperature, 0.15% soot in the form of carbon black, 1.0 liter per minutes oil lube rate, sprocket size was 21 teeth sprockets, 1000N±35 N test load, 6500 rpm±100 rpm test speed and 100 hour test length. The lubricant oil compositions, with the particular additives described below, were in contact with the timing chain during the test.

EXPERIMENTAL DATA

Example 1: Zinc Effect

There is a belief amongst some in the technical field that ZDDP, when blended into a GF5 engine oil, may provide insufficient timing chain wear protection for T-GDI engines. A study was undertaken to examine which atom in the ZDDP molecule promoted timing chain wear.

Three test oils, identical except for the specified antiwear additives, were blended and run in the timing chain wear bench test. The Control Oil 1, a fully formulated passenger car motor oil (PCMO) was blended with ZDDP at the midpoint of the GF-5 specification level for passenger car engine oils, which is 700 ppm phosphorus. Experimental Oil 1 is identical to the Control Oil 1 except that it contains VANLUBE®727, an ashless alkyldithiophosphate ester, in place of the ZDDP. VANLUBE® 727 contains sulfur and phosphorus atoms, but no zinc atoms. Experimental Oil 2 is identical to the Control Oil 1 except that it contains VANLUBE® 9123, an alkylammonium alkylphosphate salt, in place of ZDDP. VANLUBE® 9123 contains phosphorus atoms but no sulfur or zinc atoms. See Table 1 below for blend analytical test data. Unless specified otherwise, the molybdenum present in each oil is from MOLYVAN® 855 molybdenum ester amide.

TABLE 1

Key Analytical Test Data for Three Test Oils in FIG. 1

| | Experimental Oil 1 | Experimental Oil 2 | Control Oil 1 |
|---|---|---|---|
| Antiwear Additive | VANLUBE 727 | VANLUBE 9123 | ZDDP |
| Phosphorus, ppm | 729 | 687 | 677 |
| Sulfur, ppm | 1500 | 300* | 1400 |
| Zinc, ppm | <1 | <1 | 757 |
| Molybdenum, ppm | 98 | 98 | 100 |

*Residual sulfur from base oil or dilute oil used to dilute engine oil additives The timing chain bench wear test data in FIG. 1 shows wear decreasing with decreasing zinc in the finished oil. Both Experimental Oils contained significantly less zinc than the Control Oil 1.

Example 2: Zinc Level

A follow up experiment was run to further evaluate timing chain wear to zinc level in the finished oil. Experimental Oil 3 is identical to Control Oil 1 except that it contains half the ZDDP and half the VANLUBE® 727 of Experimental Oil 1, both measured by weight percent. This has the net effect of reducing the zinc level by half, while maintaining the sulfur and phosphorus levels for all three test oils as similar within test bounce. Key analytical test data for Experimental Oil 3 and how it relates to Control Oil 1 and Experimental Oil 1 are shown below in Table 2.

TABLE 2

Figure 2:
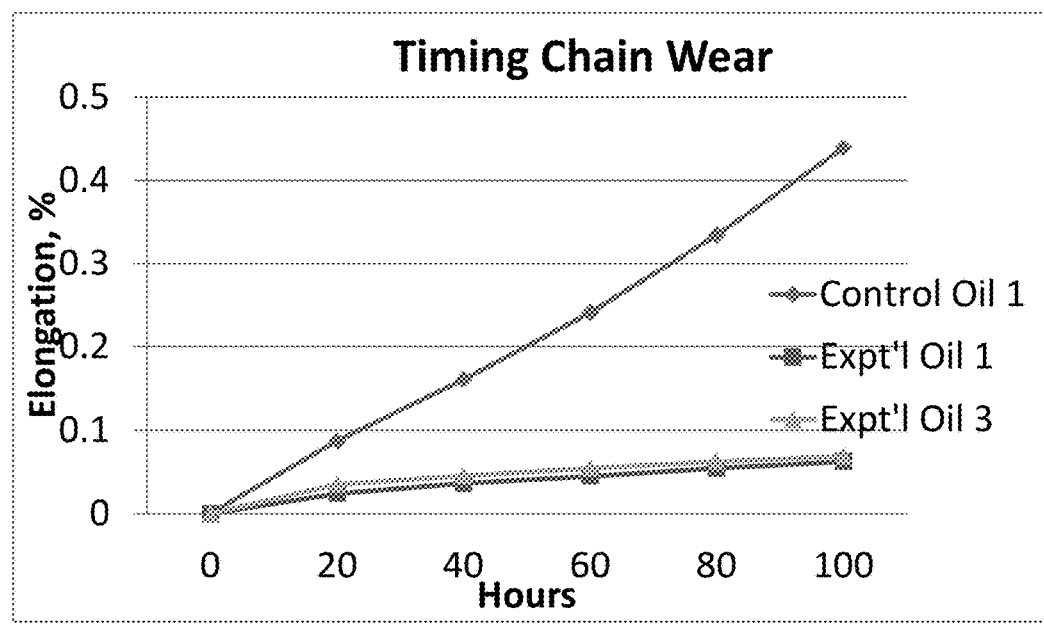
FIG. 2 is a graph showing Timing Chain Wear Bench Test Results for Test Oils with Reduced Level of Zinc.

Key Analytical Test Data for the Three Test Oils in FIG. 2

|  | Experimental Oil 1 | Experimental Oil 3 | Control Oil 1 |
|---|---|---|---|
| Antiwear Additive | VANLUBE 727 | VANLUBE 727/ZDDP | ZDDP |
| Phosphorus, ppm | 729 | 690 | 677 |
| Sulfur, ppm | 1500 | 1400 | 1400 |
| Zinc, ppm | <1 | 340 | 757 |
| Molybdenum, ppm | 98 | 102 | 100 |
| Zn:P | <.001 | .049 | 1.1 |
| Mo:Zn | >98 | .3 | .13 |

Experimental Oil 3 delivered a wear test result equivalent to Experimental Oil 1, yet it contained only half the level of zinc found in Control Oil 1 thus proving zinc plays a significant role in increasing timing chain wear. Simultaneously, this demonstrates that by maintaining the original phosphorus level with the substitution of a phosphorus containing antiwear additive, the amount of ZDDP can be reduced or eliminated while retaining the antiwear properties.

Example 3: Molybdenum Effect

Molybdenum was investigated for its timing chain antiwear properties in the timing chain wear bench test. Experimental Oil 4 and Experimental Oil 5 were blended identically to Control Oil 1, except that Experimental Oil 4 contained 684 ppm molybdenum and Experimental Oil 5 contained roughly (338 ppm) half the amount of molybdenum as Experimental Oil 5. See Table 3 below for blend analytical test data.

TABLE 3

Figure 3:
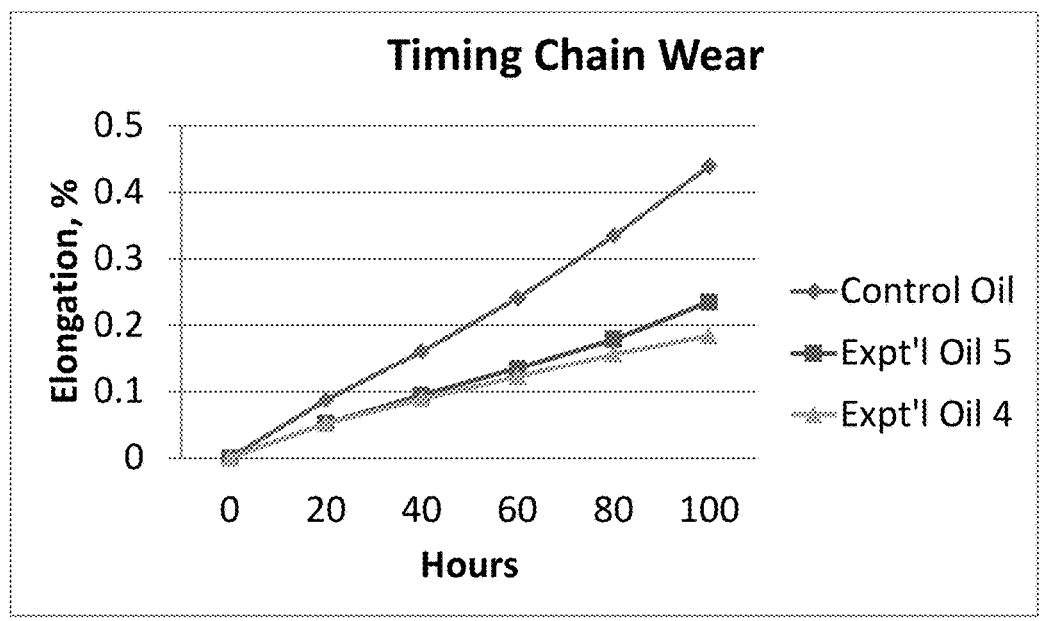
FIG. 3 is a graph showing Timing Chain Wear Bench Test Results for Test Oils with Various Levels of Molybdenum.

Key Analytical Test Data for the Three Test Oils in FIG. 3

|  | Experimental Oil 4 | Experimental Oil 5 | Control Oil 1 |
|---|---|---|---|
| Antiwear Additive | ZDDP | ZDDP | ZDDP |
| Molybdenum Friction Modifier | MOLYVAN 855 | MOLYVAN 855 | MOLYVAN 855 |
| Phosphorus, ppm | 682 | 642 | 677 |
| Sulfur, ppm | 1300 | 1400 | 1400 |
| Zinc, ppm | 755 | 684 | 757 |
| Molybdenum, ppm | 684 | 338 | 100 |
| Zn:P | 1.1 | 1.1 | 1.1 |
| Mo:Zn | 0.91 | .53 | .15 |

Experimental Oils 4 and 5 delivered better wear performance than Control Oil 1, thus demonstrating that molybdenum plays a significant role in reducing timing chain wear. Particularly at levels of at least about 100 ppm molybdenum, the presence of molybdenum mitigates the negative effect of zinc on timing chain wear, even where ZDDP is present at a standard, relatively high level.

Example 4: Preferred Molybdenum Additive

Three different molybdenum additives were tested in the timing chain wear bench test. Control Oil 1 contained a molybdenum ester amide, commercial name MOLYVAN® 855, with a molybdenum treat rate of 100 ppm. Experimental Oil 6 was formulated identically to Control Oil 1, but with a molybdenum dithiocarbamate, commercial name MOLYVAN® 822, at a treat rate of 100 ppm molybdenum.

Experimental Oil 7 was formulated identically to the Control Oil 1, but with a molybdenum dialkyldithiophosphate, commercial name MOLYVAN® L with a molybdenum treat rate of 100 ppm. Since the MoDDP contains phosphorus, Experimental Oil 7 was formulated without ZDDP meaning the phosphorus level will be skewed in comparison to Control Oil 1. ZDDP is a known antiwear additive so this oil represents a worst case scenario. See Table 4 below for finished oil analytical test data.

TABLE 4

Figure 4:
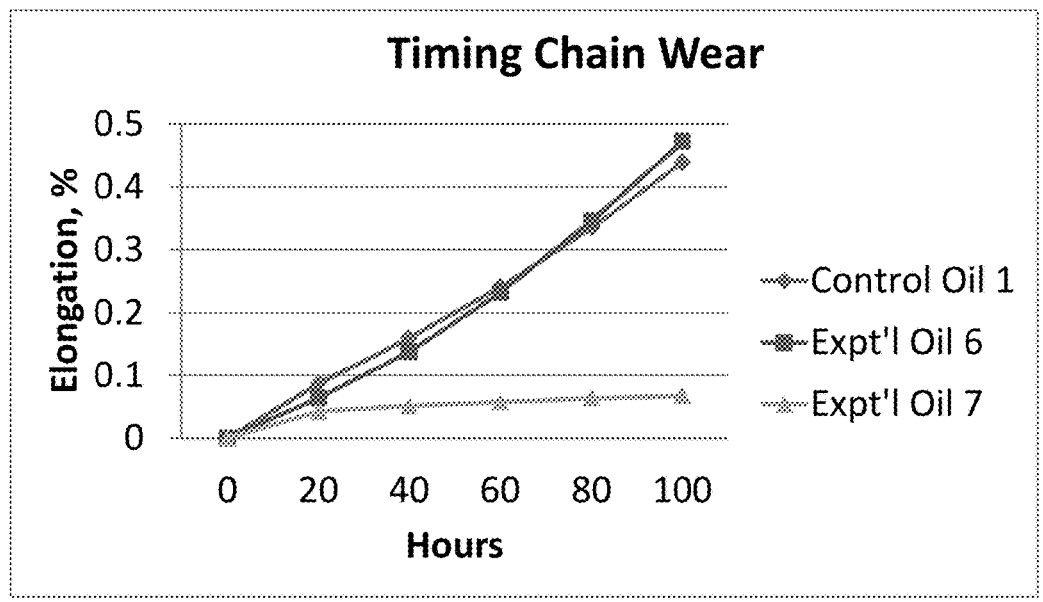
FIG. 4 is a graph showing Timing Chain Wear Bench Test Results for Test Oils Formulated With Different Molybdenum Additives.

Key Analytical Test Data for the Three Test Oils in FIG. 4

|  | Control Oil 1 Molybdenum Ester/Amide Molyvan 855 | Experimental Oil 6 Molybdenum Dithiocarbamate Molyvan 822 | Experimental Oil 7 Molybdenum dialkldithiophosphate Molyvan L |
|---|---|---|---|
| P, ppm | 677 | 684 | 65 |
| Mo, ppm | 100 | 100 | 96 |
| Zn, ppm | 757 | 759 | <1 |
| Zn:P | 1.1 | 1.1 | <0.015 |
| Mo:Zn | .15 | .15 | >96 |

Experimental Oil 7 delivered significantly better wear than either of the other two test oils which demonstrated the effectiveness of the molybdenum dithiophosphate in replacing ZDDP. Experimental Oil 6 and the Control Oil 1 both delivered a similar wear result.

Example 5: Design of Experiments

A 2 factor by 2 level Design of Experiments (DOE) was run to further investigate the effect molybdenum and zinc have on timing chain wear. A 2 factor by 2 level DOE requires 4 test oils blended in such a manner that there are two variables and each variable is present at two different levels, a low (−) and high (+) level. For this DOE, the two experimental variables are molybdenum (Mo) and zinc (Zn). Using the plus and minus notation from above, the four test oils can be described as follows: Mo(+) Zn(+), Mo(+)Zn(−), Mo(−)Zn(+) and Mo(−)Zn(−). The two molybdenum levels are about 100 ppm and about 700 ppm and the two zinc levels are about 250 ppm and about 760 ppm. Experimental Oils 4, 8 and 9 were blended identically to Control Oil 1 except that the molybdenum friction modifier MOLYVAN®855 and ZDDP antiwear additive, OLOA-262, treat rates were varied in such a manner so as to meet the requirements of the DOE described above. See Table 5 for finished oil analytical test data.

TABLE 5

Figure 5:
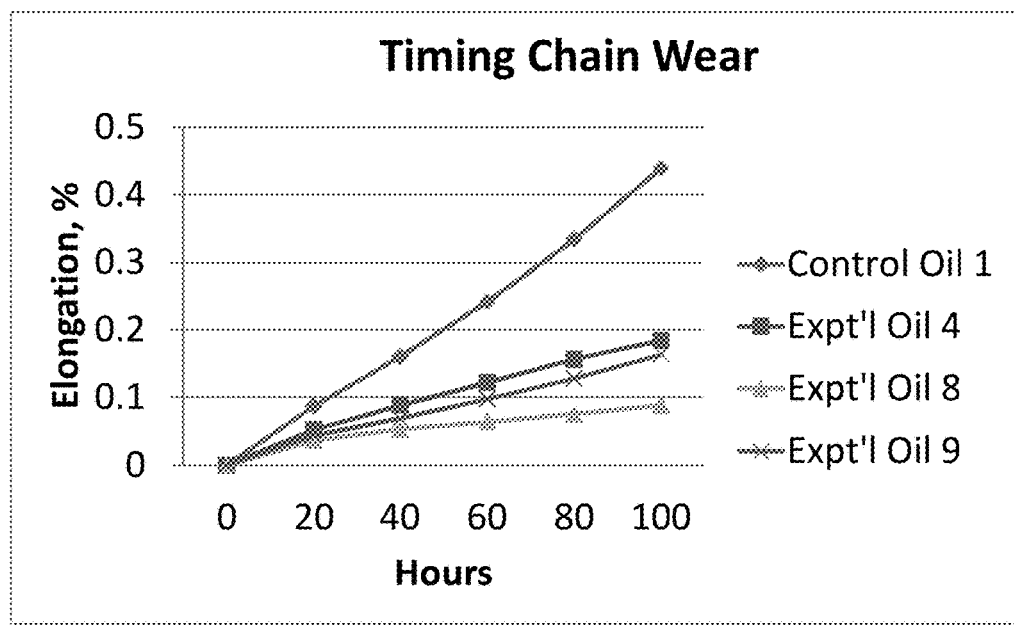
FIG. 5 is a graph showing Timing Chain Wear Bench Test Results for the Four Design of Experiment (DOE) Oils.

Key Analytical Test Data for the Four Test Oils Used in the DOE and Shown in FIG. 5

|  | Control Oil 1 | Experimental Oil 4 | Experimental Oil 8 | Experimental Oil 9 |
|---|---|---|---|---|
| Mo, ppm | 100 | 684 | 102 | 674 |
| Zn, ppm | 757 | 755 | 248 | 249 |
| Mo:Zn | .13 | .91 | .41 | 2.7 |

The wear results for the four DOE oils were entered into the Minitab Software and the following Coded Coefficient Effects were generated, see Table 6. Minitab is a well-known commercial DOE software package used by industrial statisticians conducting design of experiments.

TABLE 6

Minitab Coded Coefficient Effect for Zinc and Molybdenum

| | Coded Coefficient Effect |
|---|---|
| Zinc Effect | +0.18600 |
| Molybdenum Effect | −0.09000 |
| Zinc:Moly Interaction | −0.16500 |

The Coded Coefficient Effects provides information on the two test variables, molybdenum and zinc, with respect to increasing or decreasing timing chain wear plus the relative magnitude of that effect. It also provides the same information on the interaction between the two variables. The Coded Coefficient Effect data shows zinc in a finished oil increasing timing chain wear per the plus sign in front of the Coded Coefficient and molybdenum decreasing wear per the minus sign in front of the Coded Coefficient. The test data also shows the zinc effect is roughly twice as large as the molybdenum effect. The zinc:molybdenum interaction term shows the interaction of these two variables for reducing timing chain wear and its effect is almost as large as the zinc effect and roughly half that of the molybdenum effect. In summary, the DOE proves in a quantitative manner that zinc increases timing chain wear, molybdenum decreases timing chain wear and the zinc:molybdenum interaction reduces timing chain wear. More specifically, it is shown that by having molybdenum present at as little as about 100 ppm Mo, the ZDDP can be significantly reduced to less than about 250 ppm Zn, while still retaining adequate antiwear protection on the timing chain, with the Mo:Zn ratio is at least about 0.4:1 to about 3:1.

What is claimed is:

1. A method for reducing wear in a timing chain having a carbide or nitride coating, comprising the step of:
    contacting the timing chain with a lubricant composition consisting of:
    at least 90% by weight of a lubricant base blend, and
    (a) an ashless zinc-free organophosphorus compound selected from the group consisting of an ashless alkyldithiophosphate ester and an alkylammonium alkylphosphate salt;
        providing about 500-750 ppm phosphorus;
    (b) about 100 ppm molybdenum from molybdenum ester amide; and
    (c) optionally, an oxidation inhibitor compound chosen from the group consisting of one or more of an alkylated diphenyl amine, a non-methylene bridged sterically hindered phenol selected from the group consisting of iso-octyl-3-(3,5-di-tert-butyl-4-hydroxyphenyl) propionate, oil-soluble non-sulfur phenolics, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, and 4-dodecyl-2,6-di-tertiary butylphenol, a dithiocarbamate; and optionally one or more of a dispersant, a detergent and a viscosity modifier; such that there is <1 ppm zinc.

2. The method of claim 1, wherein the organomolybdenum compound is molybdenum ester amide.

3. A method for reducing timing chain wear, comprising:
    contacting a timing chain having a carbide or nitride coating with a lubricant composition consisting of:
    at least 90% by weight of a lubricant base,
    molybdenum dithiophosphate providing at least about 90 ppm molybdenum; and,
    at least about 50 ppm phosphorus;
    and
    optionally, an oxidation inhibitor compound chosen from the group consisting of one or more of an alkylated diphenyl amine, a non-methylene bridged sterically hindered phenol selected from the group consisting of iso-octyl-3-(3,5-di-tert-butyl-4-hydroxyphenyl) propionate, oil-soluble non-sulfur phenolics, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, and 4-dodecyl-2,6-di-tertiary butylphenol; a dithiocarbamate; and optionally one or more of a dispersant, a detergent and a viscosity modifier; such that there is <1 ppm zinc.

4. A system having reduced timing chain wear, wherein a timing chain having a carbide or nitride coating is in contact with a lubricant composition, the lubricant composition consisting of:
    at least 90% by weight of a lubricant base, and
    (a) an ashless zinc-free organophosphorus compound selected from the group consisting of an ashless alkyldithiophosphate ester and an alkylammonium alkylphosphate salt, providing 500-750 ppm phosphorus; and
    (b) about 100 ppm molybdenum from molybdenum ester amide;
    optionally, an oxidation inhibitor compound chosen from the group consisting of one or more of an alkylated diphenyl amine, a non-methylene bridged sterically hindered phenol selected from the group consisting of iso-octyl-3-(3,5-di-tert-butyl-4-hydroxyphenyl) propionate, oil-soluble non-sulfur phenolics, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, and 4-dodecyl-2,6-di-tertiary butylphenol; a dithiocarbamate; and optionally one or more of a dispersant, a detergent and a viscosity modifier; such that there is <1 ppm zinc.

5. The system of claim 4, wherein the organomolybdenum compound is molybdenum ester amide.

6. A system for reducing timing chain wear, wherein a timing chain having a carbide or nitride coating is in contact with a lubricant composition consisting of:
    at least 90% by weight of a lubricant base;
    molybdenum dithiophosphate providing at least about 90 ppm molybdenum; and,
    at least about 50 ppm phosphorus;

and optionally, an oxidation inhibitor compound chosen from the group consisting of one or more of an alkylated diphenyl amine, a non-methylene bridged sterically hindered phenol, a dithiocarbamate; and optionally one or more of a dispersant, a detergent and a viscosity modifier; wherein zinc level is less <1 ppm zinc.

\* \* \* \* \*